United States Patent [19]

Lee et al.

[11] Patent Number: 5,579,300
[45] Date of Patent: Nov. 26, 1996

[54] PRIVATE AUTOMATIC BRANCH EXCHANGE FOR INTEGRATED SERVICES DIGITAL NETWORK

[75] Inventors: Sang R. Lee, Kyoungki-do; Jin Y. Park, Seoul, both of Rep. of Korea

[73] Assignee: Hyundai Electronics Industries Co., Ltd., Kyoungki-Do, Rep. of Korea

[21] Appl. No.: 434,308

[22] Filed: May 2, 1995

Related U.S. Application Data

[63] Continuation-in-part of Ser. No. 257,007, Jun. 8, 1994, abandoned.

[30] Foreign Application Priority Data

Jun. 14, 1993 [KR] Rep. of Korea ............. 93-10825

[51] Int. Cl.⁶ .................................................. H04L 12/50
[52] U.S. Cl. ................... 370/16; 370/58.2; 370/60; 370/68.1; 370/110.1
[58] Field of Search ....................... 370/58.1, 58.2, 370/68.1, 110.1, 60, 94.1, 105.3, 16

[56] References Cited

U.S. PATENT DOCUMENTS

| | | | |
|---|---|---|---|
| 4,761,779 | 8/1988 | Nora et al. | 370/58 |
| 4,866,703 | 9/1989 | Black et al. | 370/60 |
| 5,043,989 | 8/1991 | Dalmas et al. | 370/58.1 X |
| 5,159,594 | 10/1992 | Bales et al. | 370/110.1 |
| 5,161,155 | 11/1992 | Dyer et al. | 370/110.1 |
| 5,198,808 | 3/1993 | Kudo | 370/16 X |
| 5,274,634 | 12/1993 | Babiarz | 370/60 |

FOREIGN PATENT DOCUMENTS 4-290032  3/1991  Japan ............. H04L 12/48

Primary Examiner—Douglas W. Olms
Assistant Examiner—Russell W. Blum
Attorney, Agent, or Firm—Foley & Lardner

[57] ABSTRACT

A private automatic branch exchange for an integrated services digital network, comprising primary rate interface boards. Each of the primary rate interface boards has a frame structure of 32 channels and layer-1, layer-2, layer-3 and operating system software to perform a subscriber's telephone function through interfacing with a data distribution board and a data switching board. Each of the primary rate interface boards provides a 2048 Kbps interface between the private automatic branch exchange and a central office exchange.

5 Claims, 7 Drawing Sheets

BIPOLAR SIGNAL

RxT

RxR

OUTA

OUTB

BIPOLAR SIGNAL

PRIVATE AUTOMATIC BRANCH EXCHANGE FOR INTEGRATED SERVICES DIGITAL NETWORK

This application is a continuation-in-part of application Ser. No. 08/257,007, filed June 8, 1994, abandoned.

BACKGROUND OF THE INVENTION

Field of the Invention

The present invention relates in general to a private automatic branch exchange (referred to hereinafter as PABX) for an integrated services digital network (referred to hereinafter as ISDN), and more particularly to a primary rate interface (referred to hereinafter as PRI) apparatus for the PABX.

Description of the Prior Art

Currently, digital communication systems are generally classified into North America and Europe types. The digital communication system of the Europe type provides 64 Kbps as a basic speed of an ISDN and performs line coding using a high density bipolar 3 (referred to hereinafter as HDB3) manner to minimize an error generation probability. In order to implement a PABX for the ISDN in the above-mentioned manner, a digital trunk interface apparatus has been required to provide a PRI channel.

As an example of ISDN techniques, a line switching apparatus for an ISDN data transmission system is disclosed in Japanese Patent Laid-open publication No. Heisei 4-290032, and is shown in a block form in FIG. 1, herein. As shown in FIG. 1, the line switching apparatus for the ISDN data transmission system comprises a line interface switching device 6a with a terminal adapter 61a and a line interface switching device 6b with a terminal adapter 61b. The terminal adapter 61a of the line interface switching device 6a performs a switching operation to interface a terminal controller 7 or a terminal branch device 8a to an ISDN 2 upon generation of line trouble. The terminal adapter 61b of the line interface switching device 6b performs a switching operation to interface a terminal branch device 8b to the ISDN 2 upon generation of the line trouble. The above-mentioned conventional line switching apparatus is desirable to perform a backup operation against the line trouble, but has the disadvantage that it cannot provide a direct interface between subscriber boards.

SUMMARY OF THE INVENTION

Therefore, the present invention has been made in view of the above problem, and it is an object of the present invention to provide a PABX for an ISDN in which PRI means selects a number of subscriber interface means desired by a subscriber and provides a direct interface to the subscriber interface means of the selected number in a digital communication system of the European type which provides 64 Kbps as a basic speed of the ISDN and performs line coding using an HDB3 manner, and data distribution switching means is divided into data distribution means and data switching means to reduce a load amount, the PRI means having a frame structure of 32 channels and layer-1, layer-2, layer-3 and operating system software to perform a subscriber's telephone function through interfacing with the data distribution means and data switching means, the PRI means comprising trunk interface means for providing a 2048 Kbps interface between the PABX and a central office exchange.

In accordance with the present invention, the above and other objects are accomplished by providing a private automatic branch exchange for an integrated services digital network, comprising a master shelf including first subscriber interface means connected to a group of subscribers in a basic rate interface manner, first primary rate interface means connected to an integrated services digital network exchange in a primary rate interface manner, data switching means connected to said first subscriber interface means and said first primary rate interface means to perform a switching operation and to generate system synchronous clocks of 4 MHz, 2 MHz and 8 KHz, first data distribution means for multiplexing signals from said first subscriber interface means and said first primary rate interface means in the master shelf and transferring the multiplexed signals to said data switching means, main control means connected to perform system administration/maintenance functions and a personal computer connected to said main control means to perform transferring and processing of data regarding the system administration/maintenance functions. The first primary rate interface means has a frame structure of 32 channels and layer-1, layer-2, layer-3 and operating system software to perform a subscriber's telephone function through interfacing with said first data distribution means and said data switching means.

The private automatic branch exchange also comprises a slave shelf which includes second subscriber interface means connected to the group of subscribers in the basic rate interface manner, second primary rate interface means connected to the integrated services digital network exchange in the primary rate interface manner and second data distribution means for multiplexing signals from said second subscriber interface means and said second primary rate interface means in the slave shelf and transferring the multiplexed signals to said data switching means in said master shelf. The second primary rate interface means has the frame structure of the 32 channels and the layer-1, layer-2, layer-3 and operating system software to perform the subscriber's telephone function through interfacing with said second data distribution means and said data switching means in said master shelf.

In accordance with a main feature of the present invention, each of said first and second primary rate interface means includes: processor control means for controlling the entire system (i.e., respective primary rate interface means) operation; trunk interface matching means, connected to the integrated services digital network exchange in the primary rate interface manner of means to receive a high density bipolar 3 signal, for matching input/output impedances of the high density bipolar 3 signal and for converting the high density bipolar 3 signal into a unipolar signal; trunk interface means, connected to the trunk interface matching means to receive the unipolar signal, for extracting a reference clock from the unipolar signal and outputting the extracted reference clock to said data switching means thereby allowing a synchronous signal generator thereof to generate the system synchronous clocks of 4 MHz, 2 MHz and 8 KHz and for outputting a trunk control signal and signalling channel data; serial telecommunication bus parallel access means connected to said processor control means through a system parallel bus and to said trunk interface means through a serial telecommunication bus to provide interface control for exchange of information and status information between said processor control means and said trunk interface means; high level data link control means connected to said processor control means through the system parallel bus and to said trunk interface means through the serial telecommunication bus, said high level data link control means being operated under the control of said processor control means to receive signalling channel data of a 17th one of the 32 channels from said trunk interface means, process the received signalling channel data in a predetermined format and output the processed signalling channel data to said first or second data distribution means, said high level data link control means being also operated under the control of said processor control means to receive signalling data of a high level data link control format from said first or second data distribution means and output the received signalling data to said trunk interface means; dual port memory means connected to said processor control means through the system parallel bus, said dual port memory means being operated under the control of said processor control means to transfer the processed signalling channel data from said high level data link control means to said first or second data distribution means and transfer the signalling data from said first or second data distribution means to said high level data link control means; and system status monitoring means connected to said processor control means to monitor respective system status under the control of said processor control means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
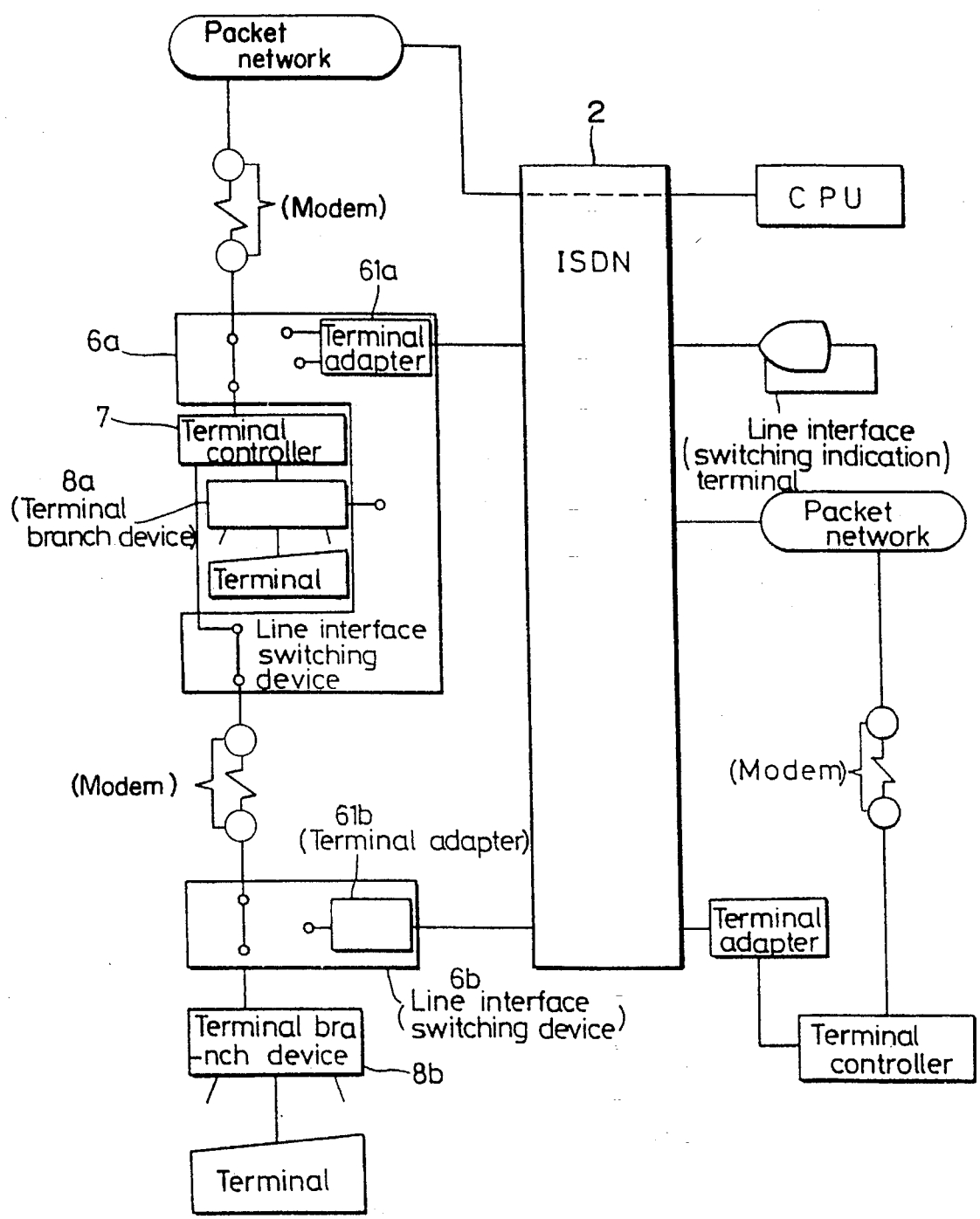
FIG. 1 is a block diagram of a conventional line switching apparatus for an ISDN data transmission system.
Figure 2A:
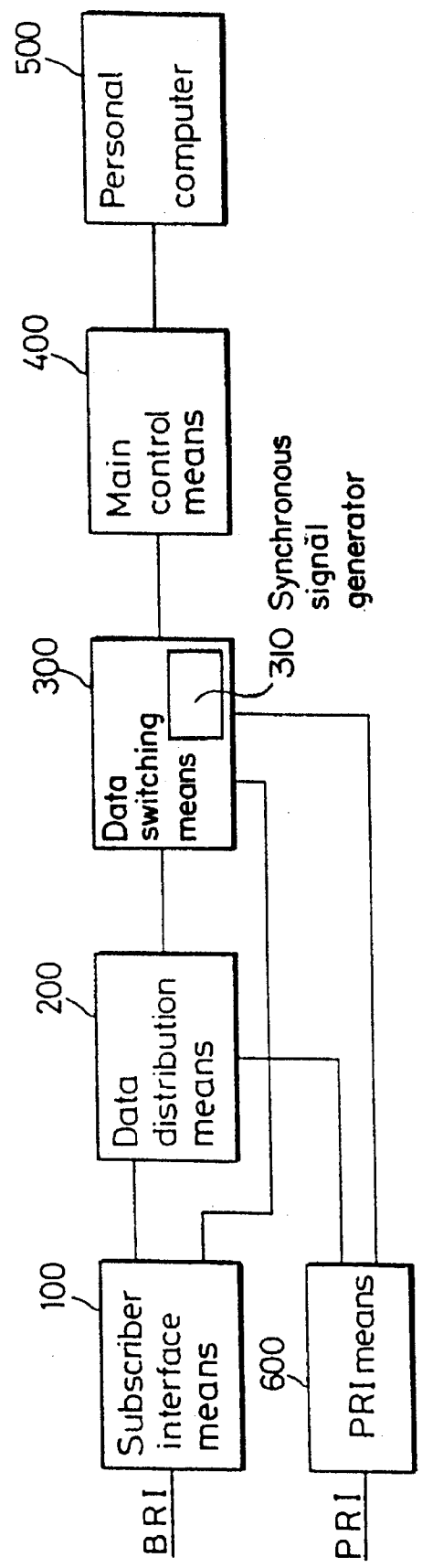
FIGS. 2A and 2B are block diagrams of master and slave shelves of a PABX for an ISDN in accordance with the present invention, respectively.
Figure 2B:
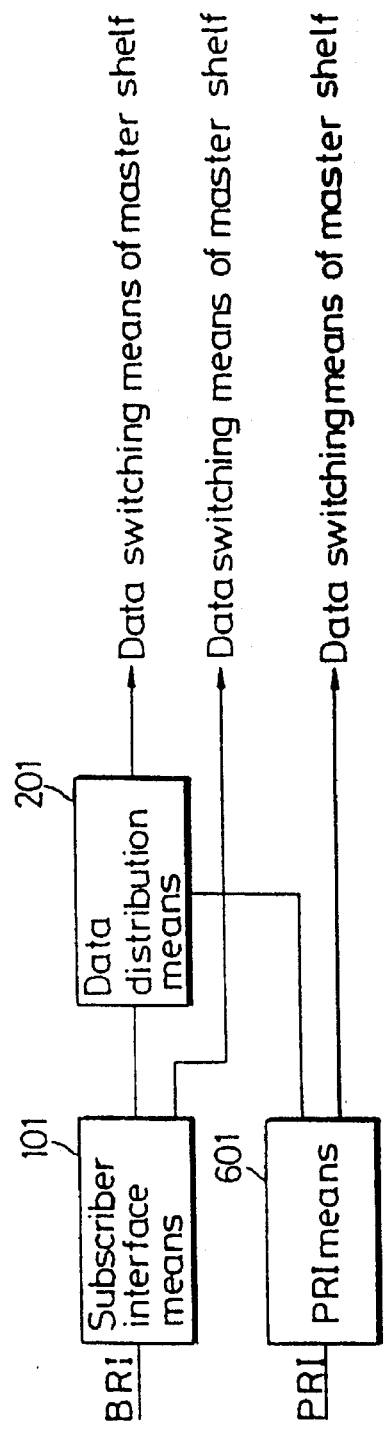

Referring to FIGS. 2A and 2B, there are shown block diagrams of master and slave shelves of a PABX for an ISDN in accordance with the present invention, respectively. As shown in FIG. 2A, the master shelf comprises subscriber interface means 100 connected to a group of subscribers in a basic rate interface (referred to hereinafter as BRI) manner and PRI means 600 connected to an ISDN exchange in a PRI manner. The PRI means 600 has a frame structure of 32 channels and layer-1, layer-2, layer-3 and operating system software to perform a subscriber's telephone function through interfacing with data distribution means 200 and data switching means 300.

The data distribution means 200 is adapted to multiplex signals from the subscriber interface means 100 and the PRI means 600 in the master shelf and transfer the multiplexed signals to the data switching means 300.

The data switching means 300 is connected to the subscriber interface means 100 and the PRI means 600 to perform a switching operation. Also, the data switching means 300 generates system synchronous clocks of 4 MHz, 2 MHz and 8 KHz.

Also, the master shelf comprises main control means 400 for performing system administration/maintenance functions and a personal computer 500 connected to the main control means 400 to perform transfer and process of data regarding the system administration/maintenance functions.

The slave shelf, as shown in FIG. 2B, comprises subscriber interface means 101 connected to the group of subscribers in the BRI manner and PRI means 601 connected to the ISDN exchange in the PRI manner. The PRI means 601 has the frame structure of the 32 channels and the layer-1, layer-2, layer-3 and operating system software to perform the subscriber's telephone function through interfacing with data distribution means 201 and the data switching means 300.

The data distribution means 201 is adapted to multiplex signals from the subscriber interface means 101 and the PRI means 601 in the slave shelf and transfer the multiplexed signals to the data switching means 300.

Figure 3:
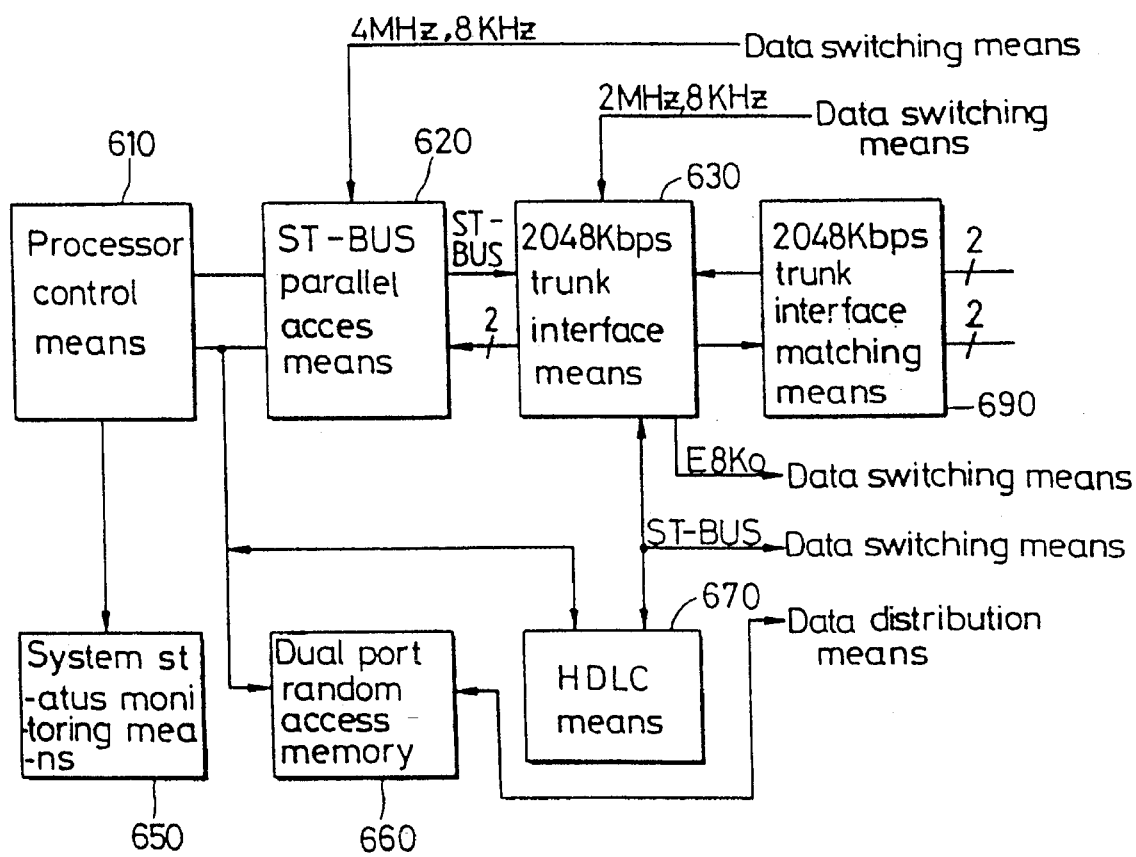
FIG. 3 is a block diagram of PRI interface means in FIGS. 2A and 2B.

Referring to FIG. 3, there is shown a block diagram of each of the PRI means 600 and 601 in the master and slave shelves. As shown in this drawing, each PRI means comprises processor control means 610, serial telecommunication bus (referred to hereinafter as ST-BUS) parallel access means 620, 2048 Kbps trunk interface means 630, 2048 Kbps trunk interface matching means 690, system status monitoring means 650, a dual port random access memory (referred to hereinafter as RAM) 660 and high level data link control (referred to hereinafter as HDLC) means 670.

The processor control means 610 is adapted to control the entire system operation.

The ST-BUS parallel access means 620 is connected to the processor control means 610 through a system parallel bus and to the 2048 Kbps trunk interface means 630 through an ST-BUS to interface control information and status information between the processor control means 610 and the 2048 Kbps trunk interface means 630.

The 2048 Kbps trunk interface means 630 is connected to the ST-BUS parallel access means 620 through the ST-BUS and to the 2048 Kbps trunk interface matching means 690 in the PRI manner. The 2048 Kbps trunk interface means 630 receives a unipolar signal from the 2048 Kbps trunk interface matching means 690, codes the unipolar signal into an ST-BUS stream format signal, codes the ST-BUS stream format signal from ST-BUS parallel access means 620 and HDLC means 670 into the unipolar signal and outputs the unipolar signal to the 2048 Kbps trunk interface matching means 690. Also, the 2048 Kbps trunk interface means 630 extracts a reference clock E8Ko from the unipolar signal and outputs the extracted reference clock E8Ko to the data switching means 300, thereby allowing a synchronous signal generator 310 thereof (FIG. 2A) to generate the system synchronous clocks of 4 MHz, 2 MHz and 8 KHz.

The 2048 Kbps trunk interface matching means 690 is connected to the 2048 Kbps trunk interface means 630 in the PRI manner. The 2048 Kbps trunk interface matching means 690 matches input/output impedances of the HDB3 signal and perform a distance setting process and an HDB3 signal allowable jitter process, converts the HDB-3 signal from PRI lines into a unipolar signal, and converts the unipolar signal into an HDB-3 signal.

The HDLC means 670 is connected to the processor control means 610 through the system parallel bus and to the 2048 Kbps trunk interface means 630 through the ST-BUS. Under the control of the processor control means 610, the HDLC means 670 receives signalling channel data of a 17th one of the 32 channels from the 2048 Kbps trunk interface means 630, processes the received signalling channel data in a predetermined format and outputs the processed signalling channel data to the data distribution means 200 or 201 through the dual port RAM 660. Also, under the control of the processor control means 610, the HDLC means receives signalling data of an HDLC format from the data distribution means 200 or 201 through the dual port RAM 660 and outputs the received signalling data to the 2048 Kbps trunk interface means 630.

The dual port RAM 660 is connected to the processor control means 610 through the system parallel bus. Under the control of the processor control means 610, the dual port RAM 660 functions as a data buffer for transferring the processed signalling channel data from the HDLC means 670 to the data distribution means 200 or 201 and transferring the signalling data from the data distribution means 200 or 201 to the HDLC means 670.

The system status monitoring means 650 is connected to the processor control means 610 to monitor a system status under the control of the processor control means 610.

In accordance with the preferred embodiment of the present invention, the processor control means 610 may include an MC68302 16-bit processor available from MOTOROLA, Inc. which contains a 68000-series core processor, three serial telecommunication channels and a communication processor. The processor control means 610 may also include a read only memory (ROM) for storing a layer-1 hardware control software, a layer-2 data link software, a layer-3 network software and an operating system software, and a read/write memory (RWM) for temporarily storing information. Further, the processor control means 610 may include a logic circuit for selecting peripheral equipments and a system reset circuit for providing a reset time of 100 ms or more for the MC68302 16-bit processor using a 555 timer.

The 2048 Kbps trunk interface means 630 is directly connected to a central office exchange or a different PABX. In accordance with the preferred embodiment of the present invention, the 2048 Kbps trunk interface means 630 may be an MH89790 (CEPT PCM30/CRC-4 FRAMER & INTERFACE) hybrid device available from MITEL, Inc. The 2048 Kbps trunk interface means 630 includes reception means 632 for converting a signal received therein into a non return to zero (NRZ) signal, which is to be processed in the 2048 Kbps trunk interface means 630, as will be described later in detail. The 2048 Kbps trunk interface means 630 separates data and the reference clock E8Ko from the converted NRZ signal and outputs the separated reference clock E8Ko to the synchronous signal generator 310 located in the data switching means 300 (FIG. 2A). In response to the reference clock E8Ko, the synchronous signal generator 310 in the data switching means 300 generates the system synchronous clocks of 4 MHz, 2 MHz and 8 KHz. Also, the 2048 Kbps trunk interface means 630 outputs the separated data to the HDLC means 670 through an information data terminal DATA SERIAL TELECOMMUNICATION 1 (DST1) and the ST-BUS. The 2048 Kbps trunk interface means 630 transmits the separated data to the data switching means 300 through the information data terminal DST1 for telecommunication with a higher-order layer.

Also, the 2048 Kbps trunk interface means 630 performs the data transmission in the reverse order of the data reception. A full transmission frame to the central office exchange consists of data channels derived from the data switching means 300 and a signalling channel derived from the HDLC means 670. In accordance with the preferred embodiment of the present invention, the 2048 Kbps trunk interface means 630 extracts the reference clock E8Ko of 8 KHz from the received data and outputs the extracted reference clock E8Ko to the data switching means 300, thereby allowing the synchronous signal generator 310 thereof to generate the system synchronous clocks of 4 MHz, 2 MHz and 8 KHz clocks for the entire system synchronization. Also, in accordance with the preferred embodiment of the present invention, the PABX may include one data switching means 300 and four PRI means 600 or 601 for the control of the entire system synchronization. The data switching means 300 may include a selection circuit for selecting one of the reference clocks E8Ko from the four PRI means 600 or 601 and outputting the selected reference clock E8Ko to the synchronous signal generator 310. Further, in accordance with the preferred embodiment of the present invention, in the case where the PABX is connected to the central office exchange, the system is operated in a slave mode in terms of the clock.

The following table 1 shows the frame structure. A multi-frame consists of 16 frames, each of which has 32 channels. Each of the 32 channels has an 8-bit size. In each of the 16 frames, channels 1 to 15 and 17 to 31 are used as the data channels, the channel 0 is used as a synchronous channel and the channel 16 is used as the signalling channel.

TABLE 1

MULTI-FRAME

| FRAME 0 | FRAME 1 | FRAME 2 | ... | FRAME 13 | FRAME 14 | FRAME 15 |
|---------|---------|---------|-----|----------|----------|----------|

FRAME

| CHANNEL 0 | CHANNEL 1 | CHANNEL 2 | ... | CHANNEL 29 | CHANNEL 30 | CHANNEL 31 |
|-----------|-----------|-----------|-----|------------|------------|------------|

TABLE 1-continued

CHANNEL

| BIT 0 | BIT 1 | BIT 2 | BIT 3 | BIT 4 | BIT 5 | BIT 6 | BIT 7 |

The 2048 Kbps trunk interface means 630 is normally operated in the above-mentioned manner under the control of the processor control means 610. Because the 2048 Kbps trunk interface means 630 is controlled through the ST-BUS, the ST-BUS parallel access means 620 is required to convert a system parallel signal from the processor control means 610 into a serial telecommunication bus signal. In accordance with the preferred embodiment of the present invention, the ST-BUS parallel access means 620 may be an MT8920 device available from MITEL, Inc. The ST-BUS parallel access means 620 has three operation modes, one of which is a microprocessor mode for accessing freely 32-channel information using its internal dual port RAMs and generating an interrupt regarding system status information. Also, the ST-BUS parallel access means 620 includes two control registers, in one of which are stored a control bit for an interrupt function, a 24/32 channel select bit and an address extension bit.

In accordance with the present invention, in response to the status information from a control data terminal CST3 of the 2048 Kbps trunk interface means 630, the ST-BUS parallel access means 620 requests the processor control means 610 to generate the interrupt or to control the system status monitoring means 650 to give an alarm. In the ST-BUS parallel access means 620, byte locations of the dual port RAMs 622–624 correspond to time slots of the serial telecommunication bus, respectively. As a result, desired values can freely be stored into the registers through a write operation.

The following table 2 shows time slot values.

CCS - - - if this bit is set to "1", a time slot 16 from an information data input terminal DSTi is made active to output common channel signalling information and information sent over a CEPT line is outputted through a channel 16 of an information data output terminal DSTo.

8K SEL - - - this bit is outputted through the 2048 Kbps trunk interface means 630 to transmit 8 KHz clock information sent over the CEPT line to the data switching board 300 for the system synchronization.

TXAIS - - - if this bit is set to "1", all values of the 32 channels sent over the CEPT line become "1".

T16AIS - - - if this bit is set to "1", all values of the 17th channel sent over the CEPT line become "1".

XCTL - - - this bit is able to set an XCTL pin of the 2048 Kbps trunk interface means 630 in a software manner.

TABLE 2

MASTER CONTROL WORD1 (MCW1) - CSTI0, CHANNEL 15

| 7 | 6 | 5 | 4 | 3 | 2 | 1 | 0 |
|---|---|---|---|---|---|---|---|
| UNUSED | LOOP16 | UNUSED | UNUSED | NDBD | NDBC | NDBB | NDBA |
| 1 | 0 | 1 | 1 | 0 | 0 | 0 | 0 |

NDBD, NDBC, NDBB and NDBA - - - if these bits are "1", no debouncing takes place with respect to received A, B, C and D signalling bits, while, if "0", debouncing of 6 ms and 8 ms takes place with respect to those bits.

MASTER CONTROL WORD2 (MCW2) - CSTI0, CHANNEL 31

| 7 | 6 | 5 | 4 | 3 | 2 | 1 | 0 |
|---|---|---|---|---|---|---|---|
| UNUSED | UNUSED | CCS | 8K SEL | TXAIS | T16AIS | XCTL | UNUSED |
| 1 | 0 | 1 | 1 | 0 | 0 | 0 | 0 |

FRAME ALIGNMENT SIGNAL - CSTI1, CHANNEL 16

| 7 | 6 | 5 | 4 | 3 | 2 | 1 | 0 |
|---|---|---|---|---|---|---|---|
| IU0 | FRAME ALIGNMENT SIGNAL - "00110011" | | | | | | |
| 1 | 0 | 1 | 1 | 0 | 0 | 0 | 0 |

NON-FRAME ALIGNMENT SIGNAL - CSTI1, CHANNEL 17

| 7 | 6 | 5 | 4 | 3 | 2 | 1 | 0 |
|---|---|---|---|---|---|---|---|
| IU1 | NFAF | ARM | RESERVED FOR INTERNATIONAL USE | | | | |
| 1 | 1 | 0 | 1 | 1 | 1 | 1 | 1 |

NFAF - - - this bit is set to "1" for distinction between a frame alignment frame and a non-frame alignment frame.

ARM - - - this bit is set to "1" to inform the central office exchange of an alarm state.

MASTER CONTROL WORD3 (MCW3) - CSTI1, CHANNEL 18

| 7 | 6 | 5 | 4 | 3 | 2 | 1 | 0 |
|---|---|---|---|---|---|---|---|
| UNUSED | SiMUX | RMLOOP | /HDB3en | Maint | CRCen | DGLOOP | ReFR |
| 0 | 0 | 0 | 0 | 0 | 1 | 0 | 0 |

SiMUX - - - if this bit is set to "1", the result of SMFT CRC is reflected in an Si1 bit of the 13th frame and the result of SMFIT CRC is reflected in an Si2 bit of the th frame.

RMLOOP - - - if this bit is set to "1", RxA and RxB which are transmitted from the reception means 632 to a CEPT link interface means 631 are directly applied to TxA and TxB, respectively.

/HDB3en - - - - - if this bit is active low, HDB3 line coding is enabled.

Maint - - - if this bit is set to "1", reframing is tried in the case where a CRC multi-frame is not formed within 8 ms for the frame synchronization or at least 914 CRC errors are generated within one second.

CRCen - - - if this bit is set to "1", a CRC process is applied to transmission data.

DGLOOP - - - if this bit is set to "1", the transmission data is looped from DSTi to DSTo.

ReFR - - - a new frame position is scanned upon transition from "1" to "0".

Figure 4:
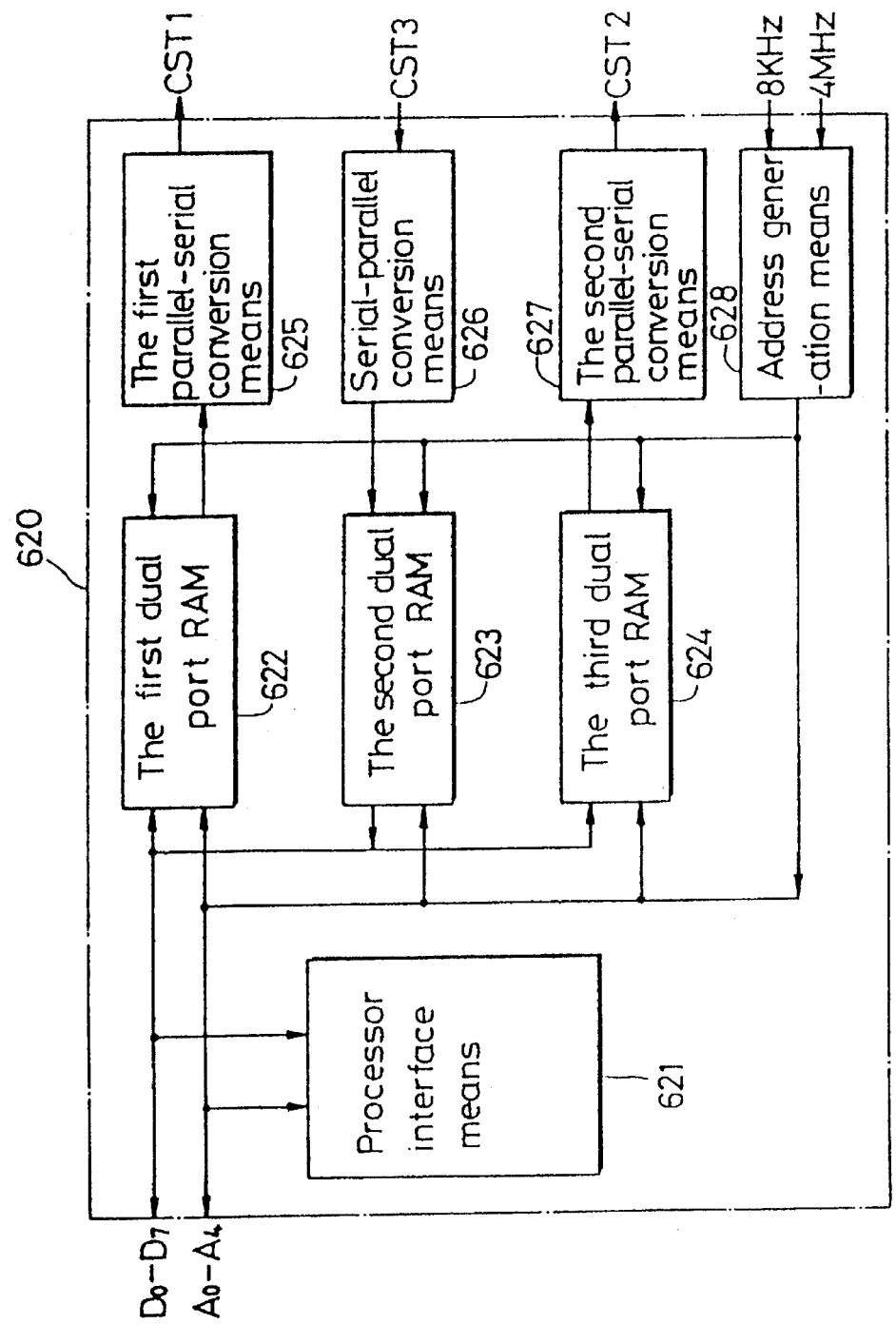
FIG. 4 is a detailed block diagram of serial telecommunication bus parallel access means of the PRI interface means in FIG. 3.

Referring to FIG. 4, there is shown a detailed block diagram of the ST-BUS parallel access means 620 of the PRI interface means 600 or 601 in FIG. 3. As shown in this drawing, the ST-BUS parallel access means 620 includes processor interface means 621, the dual port RAMs 622–624, parallel/serial conversion means 625 and 627, serial/parallel conversion means 626 and address generation means 628.

The processor interface means 621 is adapted to perform an interfacing operation with the processor control means 610.

The first dual port RAM 622 is connected to the processor interface means 621 through address/data buses to output a first trunk control signal.

The second dual port RAM 623 is connected to the processor interface means 621 and the first dual port RAM 622 through the address/data buses to receive a second trunk control signal.

The third dual port RAM 624 is connected to the processor interface means 621 and the first and second dual port RAMs 622 and 623 through the address/data buses to output a third trunk control signal.

The first parallel/serial conversion means 625 is connected to the first dual port RAM 622 through the data bus to convert the first trunk control signal from the first dual port RAM 622 into a serial stream and output the converted serial stream to the 2048 Kbps trunk interface means 630 through a control data terminal CST1.

The serial/parallel conversion means 626 is connected to the second dual port RAM 623 through the data bus to receive a serial stream from the 2048 Kbps trunk interface means 630 through the control data terminal CST3, convert the received serial stream into the second trunk control signal and a status signal and output the converted second trunk control signal and status signal to the second dual port RAM 623.

The second parallel/serial conversion means 627 is connected to the third dual port RAM 624 through the data bus to convert the third trunk control signal from the third dual port RAM 624 into a serial stream and output the converted serial stream to the 2048 Kbps trunk interface means 630 through a control data terminal CST2.

The address generation means 628 is adapted to generate addresses in response to the system synchronous clocks of 8 KHz and 4 MHz and output the generated addresses to the first to third dual port RAMs 622 to 624 and the processor interface means 621 through the address bus.

In the ST-BUS parallel access means 620, the three serial streams are connected to the system parallel bus of the processor control means 610 through the 32-byte dual port RAMs 622 to 624, respectively. The address generation means 628 generates the addresses corresponding to the 32 channels, thereby allowing the processor control means 610 to control the channels on the ST-BUS. On the other hand, when the simultaneous access is gained to the locations of the dual port RAMs 622–624, a contention takes place. To avoid this contention, the processor interface means 621 performs a handshaking process based on a data strobe signal DS and a data transmission acknowledge signal DTACK.

Figure 5:
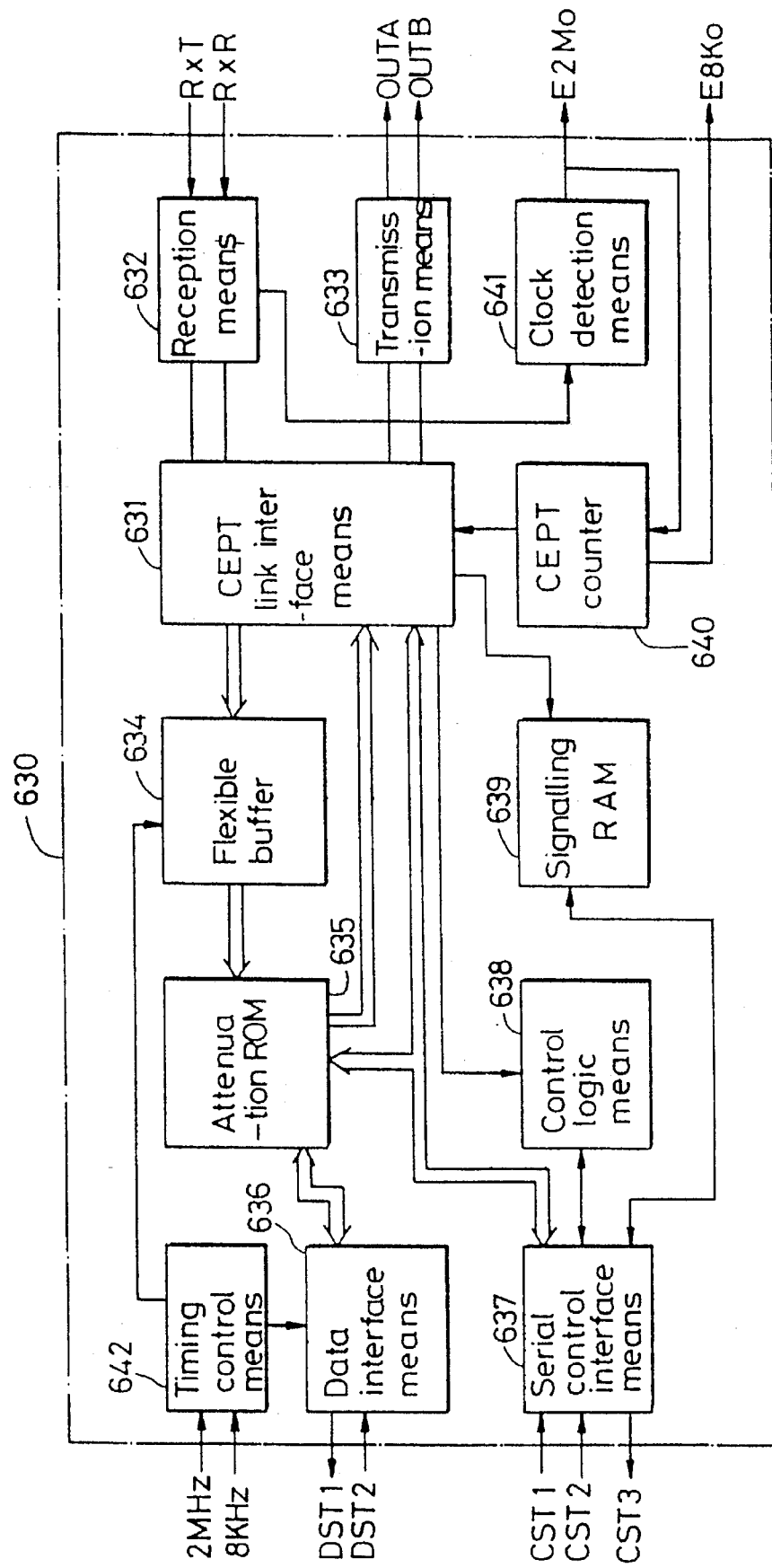
FIG. 5 is a detailed block diagram of 2048 Kbps trunk interface means of the PRI interface means in FIG. 3.

Referring to FIG. 5, there is shown a detailed block diagram of the 2048 Kbps trunk interface means 630 of the PRI interface means 600 or 601 in FIG. 3. As shown in this drawing, the 2048 Kbps trunk interface means 630 includes the CEPT link interface means 631, the reception means 632, transmission means 633, a flexible buffer 634, an attenuation ROM 635, serial control interface means 636, data interface means 637, control logic means 638, a signalling RAM 639, a CEPT counter 640, clock detection means 641 and timing control means 642.

The reception means 632 is adapted to receive a unipolar signal from the 2048 Kbps trunk interface matching means 690.

The CEPT link interface means 631 is adapted to separate information data, signalling data and a reference clock from received data from the reception means 632 in response to a clock E2Mo from the clock detection means 641.

The flexible buffer 634 is adapted to monitor a phase difference between the reference clock E8Ko and the synchronous clocks of 8 KHz and 2 MHz from the data switching means 300 and control a slip of the information data from the CEPT link interface means 631 in accordance with the monitored result.

The attenuation ROM 635 is adapted to apply an attenuation value to the information data from the flexible buffer 634 in the unit of channel and output the resultant information data to the CEPT link interface means 631.

The data interface means 636 is adapted to receive the information data from the attenuation ROM 635, transmit the received information data to the data switching means 300 and the HDLC means 670 through the information data terminal DST1 and receive information data from the data switching means 300 and the HDLC means 670 through an information data terminal DST2.

The serial control interface means 637 is adapted to receive control/status data from the CEPT link interface means 631, output the received control/status data to the ST-BUS parallel access means 620 through the control data terminal CST3 and receive control data from the ST-BUS parallel access means 620 through the control data terminals CST1 and CST2.

The control logic means 638 is adapted to receive the control data from the CEPT link interface means 631, output the received control data to the ST-BUS parallel access means 620 through the serial control interface means 637 and receive the control data from the ST-BUS parallel access means 620 through the serial control interface means 637.

The signalling RAM 639 is adapted to receive the signalling data from the CEPT link interface means 631 and store signalling bit values by channels.

The transmission means 633 is connected to the CEPT link interface means 631 to transmit the transmission data signal to the 2048 Kbps trunk interface matching means 690.

The clock detection means 641 is adapted to detect the clock (2048 KHz) E2Mo from the received data from the reception means 632 and output the detected clock E2Mo to the CEPT counter 640 and to an external E2Mo clock line.

The CEPT counter 640 is adapted to count the clock E2Mo from the clock detection means 641, generate the 8 KHz reference clock E8Ko in accordance with the counted result and output the generated 8 KHz reference clock E8Ko to the data switching means 300 and the CEPT link interface means 631.

The timing control means 642 is adapted to receive the synchronous clocks of 2 MHz and 8 KHz from the data switching means 300, synchronize input and output of the data interface means 636 with the received synchronous clocks of 2 MHz and 8 KHz and output the received synchronous clocks of 2 MHz and 8 KHz to the flexible buffer 634.

The operation of the 2048 Kbps trunk interface matching means 690 with the above-mentioned construction in accordance with the present invention will hereinafter be described in detail.

The flexible buffer 634 monitors the phase difference between the reference clock E8Ko and the synchronous clocks of 8 KHz and 2 MHz from the data switching means 300 received by the timing control means 642. As a result of the monitoring, the flexible buffer 634 controls the slip of the information data from the CEPT link interface means 631. The information data from the CEPT link interface means 631 is stored into the flexible buffer 634 in response to the clock E2Mo from the clock detection means 641 and outputted therefrom in the form of serial data stream in response to the synchronous clock of 2 MHz. A normally synchronized state of the entire system signifies that it is synchronized with the clock E2Mo obtained by detecting the system synchronous clock of 2 MHz. In this case, no data overflow or underflow is present in the flexible buffer 634.

For the data reception, the clock detection means 641 detects the clock E2Mo from the unipolar signal from the reception means 632. The data synchronization is performed according to the clock E2Mo from the clock detection means 641. Also, the CEPT counter 640 generates the 8KHz reference clock E8Ko in response to the clock E2Mo from the clock detection means 641 and outputs the generated 8 KHz reference clock E8Ko to the data switching means 300 for the system synchronization. The unipolar signal converted by an input transformer of the 2048 Kbps trunk interface matching means 690 is received by the reception means 632 and then converted into the NRZ signal thereby. The CEPT link interface means 631 separates the information data, the signalling data and the synchronous data from the NRZ signal from the reception means 632 in response to the clock E2Mo from the clock detection means 641. The information data from the CEPT link interface means 631 is applied to the flexible buffer 634, which monitors the phase difference between the reference clock E8Ko from the CEPT link interface means 631 and the synchronous clocks of 8 KHz and 2 MHz from the data switching means 300 received by the timing control means 642. As a result of the monitoring, the flexible buffer 634 controls the slip of the information data from the CEPT link interface means 631. The information data from the flexible buffer 634 is outputted through the attenuation ROM 635, the data interface means 636 and the information data terminal DST1. The control data from the CEPT link interface means 631 is outputted to the ST-BUS parallel access means 620 through the signalling RAM 639, the control logic means 638, the serial control interface means 637 and the control data terminal CST3.

For the data transmission, a data channel or a B channel from the data switching means 300 is applied to the data interface means 636 through the information data terminal DST2 and the control data from the ST-BUS parallel access means 620 is applied to the serial control interface means 637 through the control data terminals CST1 and CST2. The attenuation ROM 635 processes the information data from the flexible buffer 634 according to channel attenuation information from the data interface means 636 and the serial control interface means 637. Noticeably, the function of the attenuation ROM 635 is disregarded if the data is not a voice. The CEPT link interface means 631 inserts the signalling data from the HDLC means 670 into the 17th channel. As a result, the CEPT link interface means 631 transmits the full frame to the 2048 Kbps trunk interface matching means 690 through the transmission means 633. In this case, the full frame is converted into the HDB-3 signal to be processed in the trunk line by an output transformer of the 2048 Kbps trunk interface matching means 690.

Figure 6:
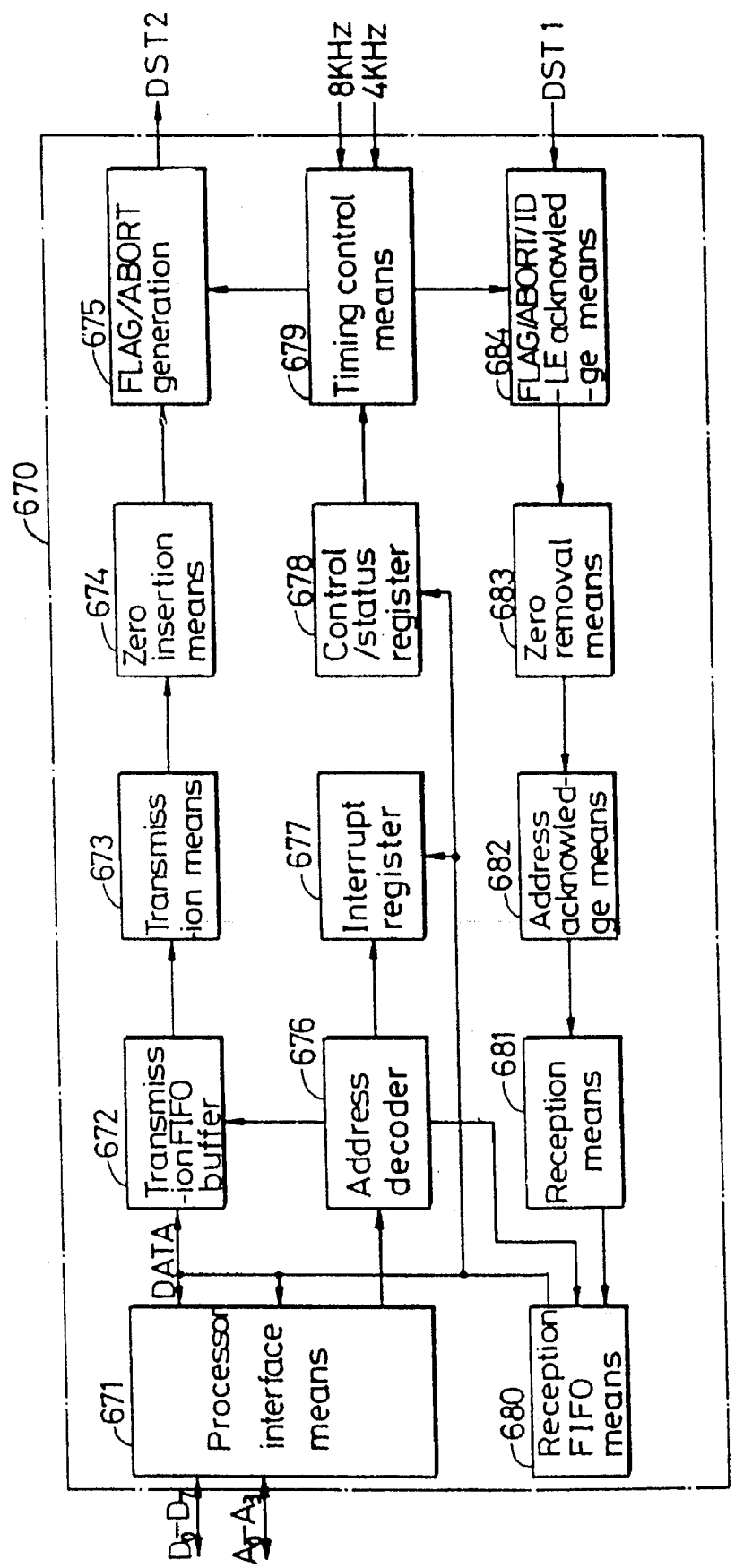
FIG. 6 is a detailed block diagram of high level data link control means of the PRI interface means in FIG. 3.

Referring to FIG. 6, there is shown a detailed block diagram of the HDLC means 670 of the PRI interface means 600 or 601 in FIG. 3. As shown in this drawing, the HDLC means 670 includes processor interface means 671, a transmission first-in-first-output (FIFO) buffer 672, transmission means 673, zero insertion means 674, FLAG/ABORT generation means 675, an address decoder 676, an interrupt register 677, a control/status register 678, timing control means 679, a reception FIFO buffer 680, reception means 681, address acknowledge means 682, zero removal means 683 and FLAG/ABORT/IDLE acknowledge means 684.

The processor interface means 671 is connected to the processor control means 610 and the dual port RAM 660 through address/data buses to perform an interfacing operation.

The transmission FIFO buffer 672 is connected to the processor interface means 671 through the data bus.

The transmission means 673 is adapted to receive signalling data from the transmission FIFO buffer 672 and output the received signalling data.

The zero insertion means 674 is connected to the transmission means to insert zero into a field of the signalling data from the transmission means 673.

The FLAG/ABORT generation means 675 is adapted to receive the zero-inserted signalling data field from the zero insertion means 674 and output the received signalling data field through the information data terminal DST2.

The address decoder 676 is connected to the processor interface means 671 through the address bus to receive addresses from the processor control means 610 and output an address decoded signal in response to the received addresses.

The interrupt register 677 is connected to the processor interface means 671 and the control/status register 678 through the data bus to read status data from the control/status register 678, generate an interrupt request signal of active low in response to the read status data and output the generated interrupt request signal to the processor control means 610.

The control/status register 678 is connected to the processor interface means 671 through the data bus to store information regarding input/output bit status of the transmission and reception FIFO buffers 672 and 680 and timing mode and status control information of the HDLC means 670.

The timing control means 679 is adapted to receive the synchronous clocks of 8 KHz and 4 MHz from the data switching means 300 and generate a serial telecommunication bus clock in response to the received synchronous clocks of 8 KHz and 4 MHz for synchronization of information data.

The FLAG/ABORT/IDLE acknowledge means 684 is adapted to receive the signalling channel data from the 2048 Kbps trunk interface means 630 through the information data terminal DST1.

The zero removal means 683 is connected to the FLAG/ABORT/IDLE acknowledge means 684 to remove the zero from the zero-inserted signalling data field from the zero insertion means 674.

The address acknowledge means 682 is connected to the zero removal means 683 to acknowledge an address from the zero removal means 683, receive the signalling data therefrom and output the acknowledged address and the received signalling data to the reception means 681.

The reception means 681 is adapted to receive the address and the signalling channel data from the address acknowledge means 682 and transfer the received address and signalling channel data to the reception FIFO buffer 680.

The reception FIFO buffer 680 is connected to the processor interface means 671, the transmission FIFO buffer 672, the address decoder 676, the interrupt register 677 and the control/status register 678 through the data bus to receive the address and the signalling channel data from the reception means 681.

In the HDLC means 670, the transmission and reception FIFO buffers 672 and 680 have 19 bytes, respectively. Each of the used frames begins with a start flag and terminates in an end flag. Present between the start and end flags are a data field and a frame check sequence (FCS) field of two bytes for error checking. Each of the start and end flags has a one-byte size and a desired bit pattern. For the frame transmission, the FLAG/ABORT generation means 675 appends the start flag to the front of the signalling data field and the end flag to the rear of the FCS field. As a result, the resultant frame is transmitted. For the frame reception, upon acknowledging the start flag, the FLAG/ABORT/IDLE acknowledge means 684 recognizes that the subsequent signalling data field is valid. As a result of the recognition, the valid signalling data field is stored into the reception FIFO buffer 680. For assurance of transparency of the signalling data, the data field is checked in the unit of bit for the transmission by the zero insertion means 674. Namely, the zero insertion means 674 inserts the zero into the signalling data field upon receiving successively 5 bits of "1". Also, the zero removal means 683 removes the zero from the signalling data field for the reception.

The HDLC means 670 acts to process the signalling channel on the ST-BUS. Namely, the HDLC means 670 transmits and receives the signalling channel to/from the data distribution means 200 or 201 through the dual port RAM 660.

In accordance with the preferred embodiment of the present invention, the HDLC means 670 may be an MT8952 device available from MITEL, Inc. In the HDLC means 670, the transmission and reception FIFO buffers 672 and 680 have 19 bytes, respectively. The states of these data buffers can be checked by status registers.

The following table 3 shows values granted to the registers of the HDLC means.

TABLE 3

(1) HDLC TIMING CONTROL REGISTER (HTCR)

| D7 | D6 | D5 | D4 | D3 | D2 | D1 | D0 |
|----|----|----|----|----|----|----|----|
| RST | IC | C1EN | BRCK | TC3 | TC2 | TC1 | TC0 |
| 0 | 1 | 0 | 0 | 0 | 0 | 1 | 1 |

RST - - - if this bit is set to "1", all the registers of the HDLC means 670 are cleared and the data in the FIFO buffers are lost.

IC - - - if this bit is set to "1", the transmitter and receiver are enabled by the timing based on the synchronous clocks of 4 MHz and 8 KHz.

C1EN - - - if this bit is set to "1", C-channel information in the first channel on the ST-BUS is enabled for the transmission.

BRCK - - - this bit is used to determine a clock rate for the internal timing mode; 4 MHz if "0" and 2 MHz if "1".

TC3–TC1 - - - the transmitter is enabled for time periods determined by these bits.

(2) HDLC CONTROL REGISTER (HCR)

| D7 | D6 | D5 | D4 | D3 | D2 | D1 | D0 |
|----|----|----|----|----|----|----|----|
| T×EN | R×EN | R×AD | RA 6/7 | IFTI 1 | IFTF 0 | FA | EOP |
| 1 | 1 | 0 | 0 | 0 | 0 | 0 | 0 |

TxEN and RxEN - - - if these bits are set to "1", the transmitter and receiver are enabled.

RxAD - - - if this bit is set to "1", an address of received packet data is acknowledged.

RA 6/7 - - - if this bit is set to "1", a byte value of the address of the received packet data is limited to six bits and, if this bit is set to "0", the byte value of the address of the received packet data is limited to seven bits.

IFTI 1 and IFTF 0 - - - these bits are used to represent states of the transmitter and receiver and to assure the transparent transmission of the data.

FA - - - this bit is used to abort a data stream to be transmitted.

EOP - - - this bit is used to indicate that a present byte is the last one of the packet.

(3) HDLC INTERRUPT ENABLE REGISTER (HIER)

| D7 | D6 | D5 | D4 | D3 | D2 | D1 | D0 |
|----|----|----|----|----|----|----|----|
| GA | EOPD | T×DONE | FA | T×4/19 FULL | T×UNDER RUN | R×15/19 FULL | R×OVER FLOW |
| 0 | 1 | 0 | 1 | 0 | 0 | 1 | 1 |

GA - - - this bit is used to acknowledge a "GO AHEAD" stream among received data streams.

EOPD - - - this bit is used to indicate that a present byte is the last one of the packet.

TxDONE - - - this bit is used to indicate that the transmission of the packet data is completed and the transmission FIFO buffer is empty.

FA - - - this bit is used to acknowledge frame abort data of the received data stream.

Tx4/19 FULL - - - this bit is used to indicate that the space of 4 bytes is present in the transmission FIFO buffer and 15 bytes are transmittable.

TxUNDERRUN - - - this bit is used to indicate that the transmission FIFO buffer is empty although no "EOP" data is sent from the HDLC means.

Rx15/19 FULL - - - this bit is used to indicate that the reception FIFO buffer has 15 bytes and is receivable the remaining 4 bytes.

RxOVERFLOW - - - this bit is used to indicate that the reception FIFO buffer is full and the receiver scans a new start flag.

If the data bits are set in the HDLC timing control register as shown in (1) of the table 3, the HDLC means is operated in the internal timing mode and the transmission means thereof is enabled by the timing based on the system clocks of 8 KHz and 4 MHz. The system clock of 8 KHz designates the start of the frame and the transmission means is enabled in the time slots determined by the lower-order 4 bits TC3–TC0. The HDLC control register of (2) of the table 3 functions to enable the transmission means and the HDLC interrupt enable register of (3) of the table 3 performs a masking operation to request the processor to generate the interrupt. In a routine for receiving the signalling channel, the data is read from the interrupt flag register, and the reception of 15 bytes is recognized if the read data indicates the reception 15/19 interrupt state. Then, data in a reception data register is transferred to a buffer designated by a pointer. But, if the read data indicates no reception 15/19 interrupt state, it is checked whether the present state is End Of Packet (EOP). If it is checked that the present state is the EOP interrupt state, the reception of the full frame is recognized and the data is thus read in the above manner. However, if it is checked that the present state is not the EOP interrupt state, the present state is regarded as a malfunction. As a result, an error message is transmitted and the reception operation is stopped.

For the data transmission, a full length of the data to be transmitted is read from the data field in the transmission buffer and then written into the FIFO status register. After the data of the read full length is written into a transmission data register, the EOP bit is set in the control register to indicate that the present byte is the last one of the transmission frame. Then, the transmission operation is ended.

The HDLC means 670 extracts automatically the signalling channel or the 17th channel of the 32 channels on the serial telecommunication bus and transmits the extracted signalling channel data to the data distribution means 200 or 201 through the dual port RAM 660 under the control of the processor. Also, the data from the data distribution means 200 or 201 is transmitted to the HDLC means 670 through the dual port RAM 660.

On the other hand, the status information from the 2048 Kbps trunk interface means 630 is received by the ST-BUS parallel access means 620 and then displayed externally by the system status monitoring means 650. The system status monitoring means 650 is adapted to display the frame alignment signal, the multi-frame alignment signal, the CRC alignment signal and other status information using a display device. Also, in accordance with the present invention, a frame synchronous signal is monitored in a timer 1 interrupt routine to be used as system synchronization information between the master system and the slave system.

The 2048 Kbps trunk interface matching means 690 includes a bipolar line transmitter and receiver. The receiver is connected to the trunk line through an input transformer, which converts the received HDB-3 signal into the unipolar signal. A 120 Ω impedance is required as the input impedance in the case where a twist wire is used for the input impedance. The transmitter is connected to the output transformer through two open collector-type outputs in which the unipolar signal is converted into the HDB-3 signal. The HDB-3 signal is sent to the trunk line through a programmable equalizer which has input/output impedances of 120 Ω and a pad of 6 dB. The trunk interface matching means 690 uses an impedance matching technique to recover noise and signal attenuation. Accordingly, the HDB-3 signal, through the PRI line cable, is matched according to the impedance matching technique in the trunk interface matching means 690. The trunk interface matching means 690 performs a distance setting process using the impedance matching technique and an allowable jitter (as a kind of noise) process.

Figure 7A:
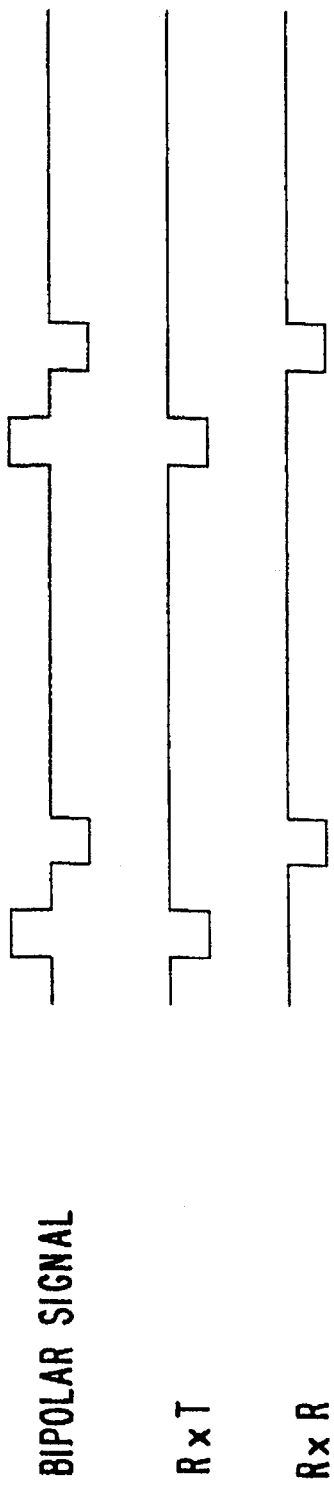
FIGS. 7A and 7B illustrate the operation of a conversion between HDB-3 signals and unipolar signals.
Figure 7B:
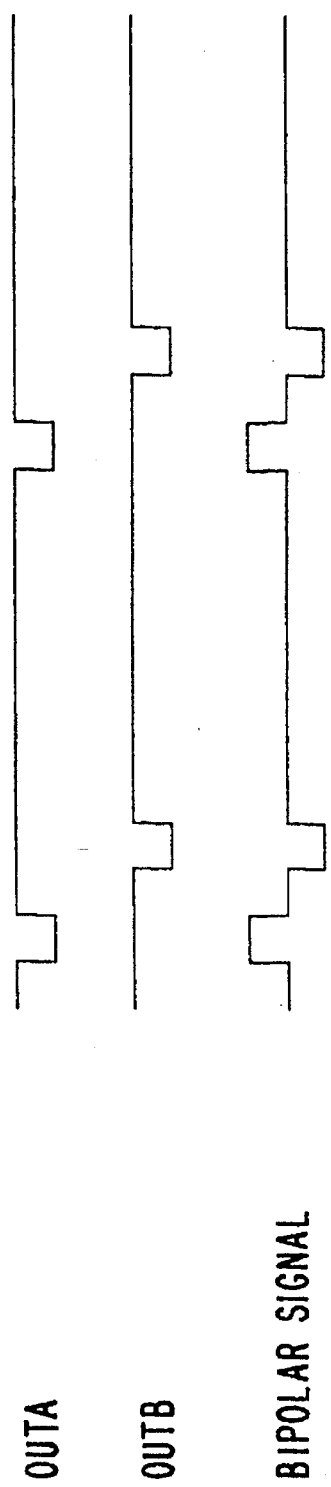

Referring to FIGS. 7A–7B, the operation of the trunk interfacing matching means 690 will be further described. As described above, the trunk interface matching means 690 includes a programmable equalizer for matching the I/O impedance of the HDB-3 signal on the PRI lines, an input transformer which converts the matched HDB-3 signal into a unipolar signal and an output transformer which converts the unipolar signal into an HDB-3 signal and outputs the HDB-3 signal. The input transformer may comprise, for example, a PULSE type transformer having a winding ratio of 5:4 and an output PULSE type transformer having a winding ratio of 2:1. The I/O transformers should satisfy an electric characteristic regulated in CCITT G.823 and I.431.

FIG. 7A illustrates the conversion from an HDB-3 signal to the unipolar signal. The bipolar signal is converted into the unipolar signal by the input transformer and the unipolar signal such as RxT, RxR is input into the reception means 632 (FIG. 5). FIG. 7B illustrates the conversion from a unipolar signal into the HDB-3 signal. A unipolar signal OUTA, OUTB received from transmission means 633 is converted into a bipolar signal by the output transformer in the trunk interface matching means 690. In this manner, the trunk interface means 630 receives a unipolar signal from the trunk interface matching means 690 and outputs the unipolar signal for the trunk control signal (CST), the information data (DST) and the reference clock (E8Ko) to means 620, 670 and 300, respectively.

As apparent from the above description, according to the present invention, the PRI means has the frame structure of the 32 channels and the layer-1, layer-2, layer-3 and operating system software. Therefore, with this construction, the PRI means can perform a subscriber's telephone function through interfacing with the data distribution means and the data switching means.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A private automatic branch exchange for an integrated services digital network, comprising:

a master shelf including,
first subscriber interface means connected to a group of subscribers in a basic rate interface manner,
first primary rate interface means connected to an integrated services digital network exchange in a primary rate interface manner,
data switching means connected to said first subscriber interface means and said first primary rate interface means to perform a switching operation and to generate system synchronous clocks of 4 MHz, 2 MHz and 8 KHz,
first data distribution means for multiplexing signals from said first subscriber interface means and said first primary rate interface means in the master shelf and for transferring multiplexed signals to said data switching means,
main control means connected to perform system administration/maintenance functions, and
a personal computer connected to said main control means to perform transferring and processing data regarding the system administration/maintenance functions,
said first primary rate interface means having a frame structure of 32 channels and layer-1, layer-2, layer-3 and operating system software to perform a subscriber's telephone function through interfacing with said first data distribution means and said data switching means; and a slave shelf including,
second subscriber interface means connected to the group of subscribers in the basic rate interface manner,
second primary rate interface means connected to the integrated services digital network exchange in the primary rate interface manner, and second data distribution means for multiplexing signals from said second subscriber interface means and said second primary rate interface means in the slave shelf and for transferring multiplexed signals to said data switching means in said master shelf, said second primary rate interface means having the frame structure of the 32 channels and the layer-1, layer-2, layer-3 and operating system software to perform the subscriber's telephone function through interfacing with said second data distribution means and said data switching means in said master shelf.

2. A private automatic branch exchange for an integrated services digital network, as set forth in claim 1, wherein each of said first and second primary rate interface means includes:

processor control means for controlling the entire operation of the respective primary rate interface means;

trunk interface matching means, connected to the integrated services digital network exchange in the primary rate interface manner to receive a high density bipolar 3 signal, for matching input/output impedances of the high density bipolar 3 signal and for converting the high density bipolar 3 signal into a unipolar signal;

trunk interface means, connected to the trunk interface matching means to receive the unipolar signal, for extracting a reference clock from the unipolar signal and outputting the extracted reference clock to said data switching means thereby allowing a synchronous signal generator thereof to generate the system synchronous clocks of 4 MHz, 2 MHz and 8 KHz and for outputting a trunk control signal and signalling channel data;

serial telecommunication bus parallel access means, connected to said processor control means through a system parallel bus and to said trunk interface means through a serial telecommunication bus to receive the trunk control signal, for performing interface control for exchange of information and status information between said processor control means and said trunk interface means;

high level data link control means, connected to said processor control means through the system parallel bus and to said trunk interface means through the serial telecommunication bus, said high level data link control means being operated under the control of said processor control means to receive signalling channel data of a 17th one of the 32 channels from said trunk interface means, process the received signalling channel data in a predetermined format and output the processed signalling channel data to said first or second data distribution means, said high level data link control means being also operated under the control of said processor control means to receive signalling data of a high level data link control format from said first or second data distribution means and output received signalling data to said trunk interface means;

dual port memory means connected to said processor control means through the system parallel bus, said dual port memory means being operated under the control of said processor control means to transfer the processed signalling channel data from said high level data link control means to said first or second data distribution means and transfer the signalling data from said first or second data distribution means to said high level data link control means; and system status monitoring means connected to said processor control means to monitor a system status of the respective primary rate interface means under the control of said processor control means.

3. A private automatic branch exchange for an integrated services digital network, as set forth in claim 2, wherein said serial telecommunication bus parallel access means includes:

processor interface means for performing an interfacing operation with said processor control means;

a first dual port random access memory connected to said processor interface means through address/data buses to output a first trunk control signal;

a second dual port random access memory connected to said processor interface means and said first dual port random access memory through the address/data buses to receive a second trunk control signal;

a third dual port random access memory connected to said processor interface means and said first and second dual port random access memories through the address/data buses to output a third trunk control signal;

first parallel/serial conversion means connected to said first dual port random access memory through the data bus to convert the first trunk control signal from said first dual port random access memory into a serial stream and output the converted serial stream to said trunk interface means through a first control data terminal;

serial/parallel conversion means connected to said second dual port random access memory through the data bus to receive a serial stream from said trunk interface means through a second control data terminal, convert the received serial stream into the second trunk control signal and a status signal and output the converted second trunk control signal and status signal to said second dual port random access memory;

second parallel/serial conversion means connected to said third dual port random access memory through the data bus to convert the third trunk control signal from said third dual port random access memory into a serial stream and output the converted serial stream to said trunk interface means through a third control data terminal; and address generation means for generating addresses in response to the system synchronous clocks of 8 KHz and 4 MHz and outputting the generated addresses to said first to third dual port random access memories and said processor interface means through the address bus.

4. A private automatic branch exchange for an integrated services digital network, as set forth in claim 2, wherein said trunk interface means includes:

reception means for receiving the unipolar signal from said trunk interface matching means;

CEPT link interface means, connected to receive the unipolar signal from the reception means, for separating information data, signalling data and synchronous data from the unipolar signal;

a flexible buffer for monitoring a phase difference between the reference clock and the synchronous clocks of 8 KHz and 2 MHz from said data switching means and controlling a slip of the information data from said CEPT link interface means in accordance with the monitored result;

an attenuation read only memory for applying an attenuation value to the information data from said flexible buffer and outputting the resultant information data to said CEPT link interface means;

data interface means for receiving the information data from said attenuation read only memory, transmitting the received information data to said data switching means and said high level data link control means through a first information data terminal and receiving information data from said data switching means and said high level data link control means through a second information data terminal;

serial control interface means for receiving control/status data from said CEPT link interface means, outputting the received control/status data to said serial telecommunication bus parallel access means through a first control data terminal and receiving control data from said serial telecommunication bus parallel access means through second and third control data terminals;

control logic means for receiving the control data from said CEPT link interface means, outputting the received control data to said serial telecommunication bus parallel access means through said serial control interface means and receiving additional control data from said serial telecommunication bus parallel access means through said serial control interface means;

a signalling random access memory for receiving the signalling data from said CEPT link interface means and storing signalling bit values by channels;

transmission means connected to said CEPT link interface means to transmit a unipolar signal to said trunk interface matching means;

clock detection means for detecting a clock from the unipolar signal from said reception means;

a CEPT counter for counting the clock from said clock detection means, generating the reference clock in accordance with the counted result and outputting the generated reference clock to said data switching means and said CEPT link interface means; and timing control means for receiving the synchronous clocks of 2 MHz and 8 KHz from said data switching means, synchronizing input and output of said data interface means with the received synchronous clocks of 2 MHz and 8 KHz and outputting the received synchronous clocks of 2 MHz and 8 KHz to said flexible buffer.

5. A private automatic branch exchange for an integrated services digital network, as set forth in claim 2, wherein said high level data link control means includes:

processor interface means connected to said processor control means and said dual port memory means through address/data buses to perform an interfacing operation;

a transmission FIFO buffer connected to said processor interface means through the data bus;

transmission means for receiving signalling data from said transmission FIFO buffer and outputting the received signalling data;

zero insertion means connected to said transmission means to insert zero into a field of the signalling data from said transmission means;

FLAG/ABORT generation means for receiving the zero-inserted signalling data field from said zero insertion means and outputting the received signalling data field through a first information data terminal;

an address decoder connected to said processor interface means through the address bus to receive addresses from said processor control means and output an address decoded signal in response to the received addresses;

a control/status register connected to said processor interface means through the data bus to store information regarding input/output bit status of said transmission FIFO buffer and a reception FIFO buffer, and timing mode and status control information of said high level data link control means;

an interrupt register connected to said processor interface means and said control/status register through the data bus to read status data from said control/status register, generate an interrupt request signal of active low in response to the read status data and output the generated interrupt request signal to said processor control means;

timing control means for receiving the synchronous clocks of 8 KHz and 4 MHz from said data switching means and generating a serial telecommunication bus clock in response to the received synchronous signals of 8 KHz and 4 MHz for synchronization of information data;

FLAG/ABORT/IDLE acknowledge means for receiving the signalling channel data from said trunk interface means through a second information data terminal;

zero removal means connected to said FLAG/ABORT/IDLE acknowledge means to remove the zero from the zero-inserted signalling data field from said zero insertion means;

address acknowledge means connected to said zero removal means to acknowledge an address from said zero removal means and receive the signalling data therefrom; and reception means for receiving the address and the signalling channel data from said address acknowledge means and transferring the received address and signalling channel data to said reception FIFO buffer;

said reception FIFO buffer being connected to said processor interface means, said transmission FIFO buffer, said address decoder, said interrupt register and said control/status register through the data bus to receive the address and the signalling channel data from said reception means.

\* \* \* \* \*